United States Patent
Richardson et al.

(10) Patent No.: US 10,024,751 B2
(45) Date of Patent: Jul. 17, 2018

(54) FLUID SYSTEM EVALUATION WITH MULTIPLE CHEMICAL TRACERS

(71) Applicant: CHEMTREAT, INC., Glen Allen, VA (US)

(72) Inventors: John Richardson, Hanover, VA (US); Kevin White, Richmond, VA (US); Patrick Wood, Richmond, VA (US); James Wilkins, Midlothian, VA (US)

(73) Assignee: CHEMTREAT, INC, Glen Allen, VA (US)

( * ) Notice: Subject to any disclaimer, the term of this patent is extended or adjusted under 35 U.S.C. 154(b) by 75 days.

(21) Appl. No.: 15/237,099

(22) Filed: Aug. 15, 2016

(65) Prior Publication Data

US 2017/0045413 A1  Feb. 16, 2017

Related U.S. Application Data

(60) Provisional application No. 62/205,430, filed on Aug. 14, 2015.

(51) Int. Cl.
| | |
|---|---|
| *G01M 3/22* | (2006.01) |
| *E03B 7/00* | (2006.01) |
| *F17D 5/02* | (2006.01) |

(52) U.S. Cl.
CPC .............. *G01M 3/22* (2013.01); *E03B 7/003* (2013.01); *F17D 5/02* (2013.01)

(58) Field of Classification Search
CPC ........... G01M 3/22; G01M 3/20; E03B 7/003; F17D 5/02
See application file for complete search history.

(56) References Cited

U.S. PATENT DOCUMENTS

| | | | |
|---|---|---|---|
| 4,783,314 | A | 11/1988 | Hoots et al. |
| 5,320,967 | A | 6/1994 | Avallone et al. |
| 5,363,693 | A | 11/1994 | Nevruz |
| 5,736,405 | A | 4/1998 | Alfano et al. |
| 5,817,927 | A | 10/1998 | Chen et al. |
| 5,959,306 | A | 9/1999 | Kalley et al. |
| 6,484,108 | B1 | 11/2002 | Burgmayer et al. |
| 7,220,382 | B2 | 5/2007 | Godfrey et al. |
| 7,448,255 | B2 | 11/2008 | Hoots et al. |

(Continued)

FOREIGN PATENT DOCUMENTS

EP  0640747 A1  3/1995

OTHER PUBLICATIONS

Durham et al., "Recovery-boiler leak detection using a waterside chemical-mass-balance method," Tappi Journal, vol. 79, No. 11, Nov. 1996, pp. 138-147.

(Continued)

*Primary Examiner* — Son Le
*Assistant Examiner* — David Z Huang
(74) *Attorney, Agent, or Firm* — Oliff PLC

(57) ABSTRACT

Multiple chemical tracers are provided in a fluid system, and measured to evaluate parameters of the system. The multiple chemical tracers include at least one reactive chemical tracer that provides a measurable signal with an intensity that changes as the reactive chemical tracer reacts in the fluid system. The signals of the multiple chemical tracers are compared to each other to evaluate a system parameter, such as temperature, pH, or system events.

24 Claims, 12 Drawing Sheets
(6 of 12 Drawing Sheet(s) Filed in Color)

(56) References Cited

U.S. PATENT DOCUMENTS

| | | | |
|---|---|---|---|
| 8,399,856 B2 | 3/2013 | Ingenbleek et al. | |
| 2005/0042758 A1 | 2/2005 | Zyhowski et al. | |
| 2005/0160795 A1* | 7/2005 | Hoots | G01M 3/20 73/40.7 |
| 2006/0248941 A1 | 11/2006 | Maresca et al. | |
| 2007/0051165 A1* | 3/2007 | Maresca, Jr. | G01M 3/22 73/40.5 R |
| 2008/0000287 A1 | 1/2008 | Hoots et al. | |

OTHER PUBLICATIONS

Gommi, "Status of Leak Detection Methods for Recovery Units in North America," Tappi Journal, vol. 81, No. 10, Oct. 1998, pp. 69-75.

Baxter et al., "Superior Recovery Boiler Water Chemistry Control and Leak Indication Achieved with New Monitoring and Control System," PEERS, 2015, pp. 1521-1537.

Rose et al., The Use of Amino G as a Thermally Reactive Tracer for Geothermal Applications, Proceedings World Geothermal Congress 2015, Apr. 2015, pp. 1-5.

Al-Ghamdi, Performance Analysis of Automated Control System for Condenser Water Treatment Unit, Engineering, 2012, pp. 55-67.

Rose et al., The application of the polyaromatic sulfonates as tracers in geothermal reservoirs, Geothermics, 2001, pp. 617-640.

Nevruz, A., A Proven and Patented Method to Detect Small Leaks in the Recovery Boiler, TAPPI Eng. Conf, 1995, pp. 479-484.

Buckner, et al., Design & Implementation of a Commercial Acoustic Leak-Detection System for Black Liquor Recovery, TAPPI Journal, Jul. 1990, pp. 121-127.

Racine, et al., An Expert System for Detecting Leaks in Recovery-Boiler Tubes, TAPPI Journal, Jun. 1992, pp. 147-152.

Durham, et al., Black Liquor Recovery Boiler Leak Detection: Indication of Boiler Water Loss Using a Waterside Chemical Mass Balance Method, TAPPI Journal, Nov. 1995, pp. 144-155.

Gommi, J., Status of Leak Detection Methods for Recovery Units in North America, TAPPI Jrnl, vol. 81,No. 10, Oct. 1998, pp. 69-75.

Racine, J., Recovery Boiler Advisor helps Mills to Diagnose Tube Leaks, Papermaker, Mar. 1995, pp. 21-23.

Marziale et al., Using Sound to Detect Boiler Leaks, TAPPI Jrnl, Jul. 1989, pp. 67-71.

Gommi, J., Root Causes of Recovery Boiler Leaks, Int'l Chem Conf., TAPPI Jrnl, Sep. 1998, pp. 72-80.

Dukelow, S., The Control of Boilers, Instrument Society of America, 1986, pp. 1-2 and 110-114.

Flury et al., Dyes as Tracers for Vadose Zone Hydrology, Reviews of Geophysics, 2003, vol. 41, No. 1, pp. 2-1-2-37.

Mar. 27, 2017 International Search Report issued in International Application No. PCT/US2016/047030.

Mar. 27, 2017 Written Opinion issued in International Application No. PCT/US2016/047030.

Feb. 20, 2018 International Preliminary Report on Patentability issued in International Application No. PCT/US2016/047030.

\* cited by examiner

FLUID SYSTEM EVALUATION WITH MULTIPLE CHEMICAL TRACERS

CROSS-REFERENCE TO RELATED APPLICATIONS

This application claims the benefit of U.S. Provisional Application No. 62/205,430, filed on Aug. 14, 2015, the entirety of which is incorporated by reference herein.

TECHNICAL FIELD

This disclosure is directed to methods for evaluating properties of fluid systems using multiple chemical tracers, including at least one reactive chemical tracer that reacts in the water.

BACKGROUND

Industrial or municipal fluid systems can be monitored to observe parameters of the system, including fluid properties such as temperature or pH, as well as events that are indicative of process system conditions. Fluid systems can thus be monitored to ensure that the system is operating safely and to achieve the performance that is desired. For example, boiler water systems are very closely monitored to determine whether the water system has any water leaks. Early leak detection is extremely important in boiler systems because water leakage, e.g. due to corrosion or equipment failure, can cause catastrophic explosions. Accordingly, many boiler water systems include multiple leak detection mechanisms including, e.g., mass balance, acoustic analysis, and/or visual observation.

Chemical tracers have also been used in water systems to evaluate the water system and provide useful information regarding temperature, impurities, reaction products, etc. Inert chemical tracers that do not react in the water system are typically added to the water system and measured at a point of interest in the system to evaluate these properties.

SUMMARY

In one aspect, this disclosure provides an accurate and reliable method for evaluating events in a fluid system. The method can include introducing a plurality of chemical tracers into the fluid system, including at least one reactive tracer that is reactive in the fluid system. The plurality of chemical tracers provide a measurable signal, and the measurable signal of the reactive tracer changes intensity as the tracer reacts in the water system. The signals of each of the plurality of chemical tracers can be measured in the water system in an operating condition of the water system. The measured signal of the reactive chemical tracer with the measured signal of another chemical tracer of the plurality of chemical tracers can then be used (e.g., as a ratio) as an indicator of a water system operating response. The indicator of the water system operating response can then be compared with an indicator of an expected response of the water system response, and it can be determined whether an event has occurred in the water system based on this comparison.

In another aspect, this disclosure provides a method for evaluating a parameter of a water system that includes providing the water system with at least a first reactive chemical tracer and a second reactive chemical tracer in a known ratio. Each of the first and second reactive chemical tracers can be reactive in the water system and each can provide a measurable signal that changes intensity as the tracer reacts in the water system. The signals of the first and second chemical tracers can be used to evaluate the water system parameter.

In another aspect, this disclosure provides a method of detecting leaks in a water system where heated water circulates through the system. The method includes providing a plurality of chemical tracers into a stream of the water system, including at least one thermally reactive tracer. Each of the plurality of chemical tracers provides a measurable signal, and the measurable signal of the thermally reactive tracer changes intensity based on water temperature. The signals of each of the plurality of chemical tracers can be measured in the water system in an operating condition. The measured signals can be compared to each other (e.g., as a ratio) and the comparison can be used as an indicator of a water system operating response. The indicator of the water system response can be compared with an indicator of an expected response of the water system response, and a leak condition of the water system can be detected if it is determined that the water system operating response deviates by a threshold amount from the expected response of the water system.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various exemplary embodiments of this disclosure will be described in detail with reference to the following figures, wherein like numerals reference like elements, and wherein.

DETAILED DESCRIPTION OF THE EMBODIMENTS

Figure 1A:
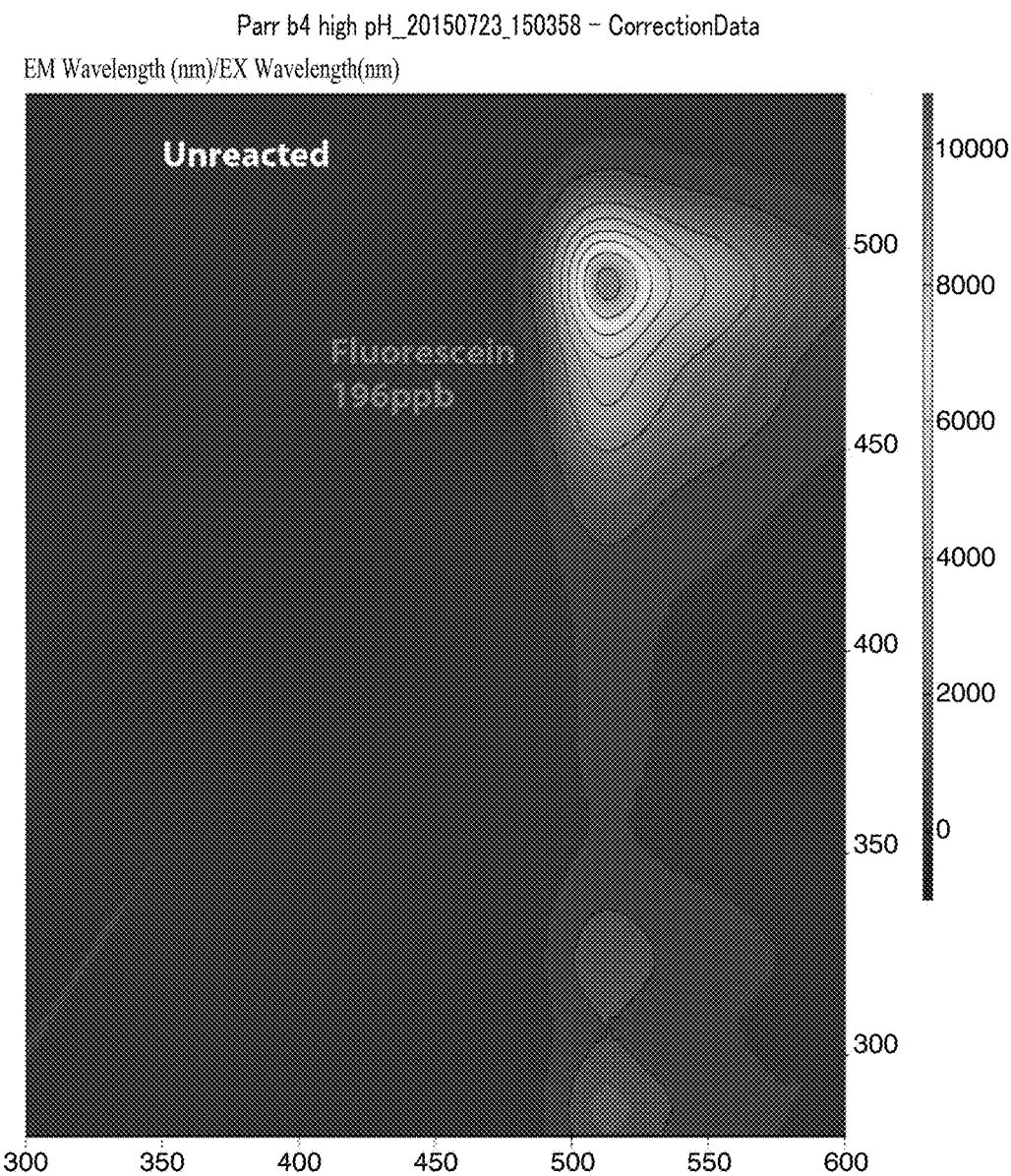
FIGS. 1A-1F are representations of 3D fluorescent scans showing the behavior of fluorescein dye with water temperature.

It was discovered that various parameters of fluid systems can be evaluated conveniently, accurately, and timely by providing multiple chemical tracers in the fluid system, including at least one reactive chemical tracer, and measuring signals of the tracers. By way of example, the invention can be applied to water systems such as a boiler water system, a cooling tower system, a heat exchange system, a municipal water system, a cleaning system for a food processing plant, and the like. In such systems, water can flow or circulate through the system as a liquid or as steam or both. The system can include various equipment and stages. For example, a boiler water system can include a boiler stage and a heat exchanger stage. The invention can also be applied to other fluid systems where the fluid includes liquids such as oil, oil/water mixtures, petrochemicals, solvents, etc. Although aspects of the invention are described herein with reference to water systems, it should be understood that the description can be equally applicable to fluid systems containing other liquids.

The use of a reactive chemical tracer together with at least one other chemical tracer (either reactive or inert) can yield information about parameters or the fluid system, including equipment used in the system, that otherwise can be difficult to measure. Such parameters include, but are not limited to, maximum and minimum system temperature, maximum and minimum system pH, system holding time, system fluid volume, product half-life, oxygen content, dissolved gas content, surface fouling due to corrosion or scale (deposition), and skin temperature of equipment in the fluid system.

A chemical tracer is a chemical compound, complex, or ion that provides a measurable signal in the fluid system. Examples of chemical tracers can include dyes or pigments. The signal provided by the chemical tracer can include optical signals, for example, light absorption, atomic emission, or fluorescence at a given light wavelength. Depending on the chemical tracer, the signal can be detected by techniques such as fluorescence spectroscopy, ICP, colorimetric spectroscopy, infrared, etc.

The multiple chemical tracers include at least one reactive chemical tracer that is reactive in the fluid system, and in some embodiments two or more reactive chemical tracers. Reactive chemical tracers react in the fluid system so that the measurable signal associated with the reactive chemical tracer changes intensity in the fluid system depending on a property of the system. The reactive chemical tracers can react so that, for a given quantity of the tracer, the corresponding signal intensity changes with one or more of fluid temperature, pressure, pH, oxygen content, hydrocarbon content, or other properties.

It is also contemplated that reactive chemical tracers can be synthesized to react with specific temperatures, specific pH levels, or other specific process stream conditions, so that a signal corresponding to the reactive chemical tracer changes intensity when these specific threshold conditions are met.

The reactive chemical tracers should preferably have predictable responses to the fluid system conditions under ideal or controlled conditions, so that the reactive chemical tracer breaks down at a predictable rate or so that the intensity of the measurable signal otherwise changes at a predictable rate in response to the fluid conditions. If multiple reactive tracers are used, they can be selected to break down at different rates or otherwise provide measurable signals that change at different rates in response to the fluid conditions. The measurable signals of the multiple tracers should preferably be selected so that they do not interfere with each other. For example, if multiple tracers with optical signals are used, the signals can be detectable at different wavelengths.

Whether a given tracer is considered to be reactive or inert depends on the system environment and whether the tracer reacts in that environment. In certain environments, such as very high temperatures or pressures, all tracers may be considered to be reactive.

Suitable tracers for some of the applications contemplated in this disclosure include, but are not limited to, fluorescein, uranine, disazo dyes, stillbene dyes, diphenyl methane dyes, triphenyl methane dyes, xanthene dyes, triazole dyes, thiazole dyes, azine dyes, oxazine dyes, thiazine dyes, anthraquinone dyes, aminoketone dyes, optical brighteners, naphthalene sulfonic acids, pyrenetetrasulfonic acid (PTSA), and monoazo dyes. Suitable tracers may also include those disclosed in Flury et al., Dyes as Tracers For Vadose Zone Hydrology, *Reviews of Geophysics*, 41, 1, pp. 2-1 to 2-37 (2003). Fluorescein is useful in many of the applications discussed herein because it is reactive in fluid systems that operate at high temperatures. It breaks down at temperatures in the range of e.g., 200-300° C.

In addition to the reactive chemical tracer, the fluid system can include at least one "inert" chemical tracer that does not react with the fluid system, and provides a measurable signal that is substantially constant in the fluid system for a given quantity of the tracer (i.e., varying less than about 5%).

The chemical tracers, whether reactive or inert, can be directly added to the fluid system, or the chemical tracers can be provided in the fluid system by adding other precursor compounds or components to the fluid system, which then break down or otherwise yield the chemical tracers. Thus, either or both of the reactive or other chemical tracer used in embodiments of the invention can be breakdown products of one or more compounds that are added to the fluid system.

It is similarly contemplated that a single discrete compound added to the fluid system could break down or transform into the multiple chemical tracers that each provide discrete measurable signals that can be detected. Likewise, a reactive tracer can be provided in the fluid system that provides a measurable signal that changes intensity as the reactive tracer breaks down, and further creates a break down product that provides another measurable signal. The break down product can itself be either inert or reactive, providing a measurable signal that can be compared against the precursor reactive tracer signal. Fluorescein is one such reactive tracer that breaks down under high temperature to provide a relatively inert (or less reactive) break down product that provides a measurable signal.

Figure 1B:
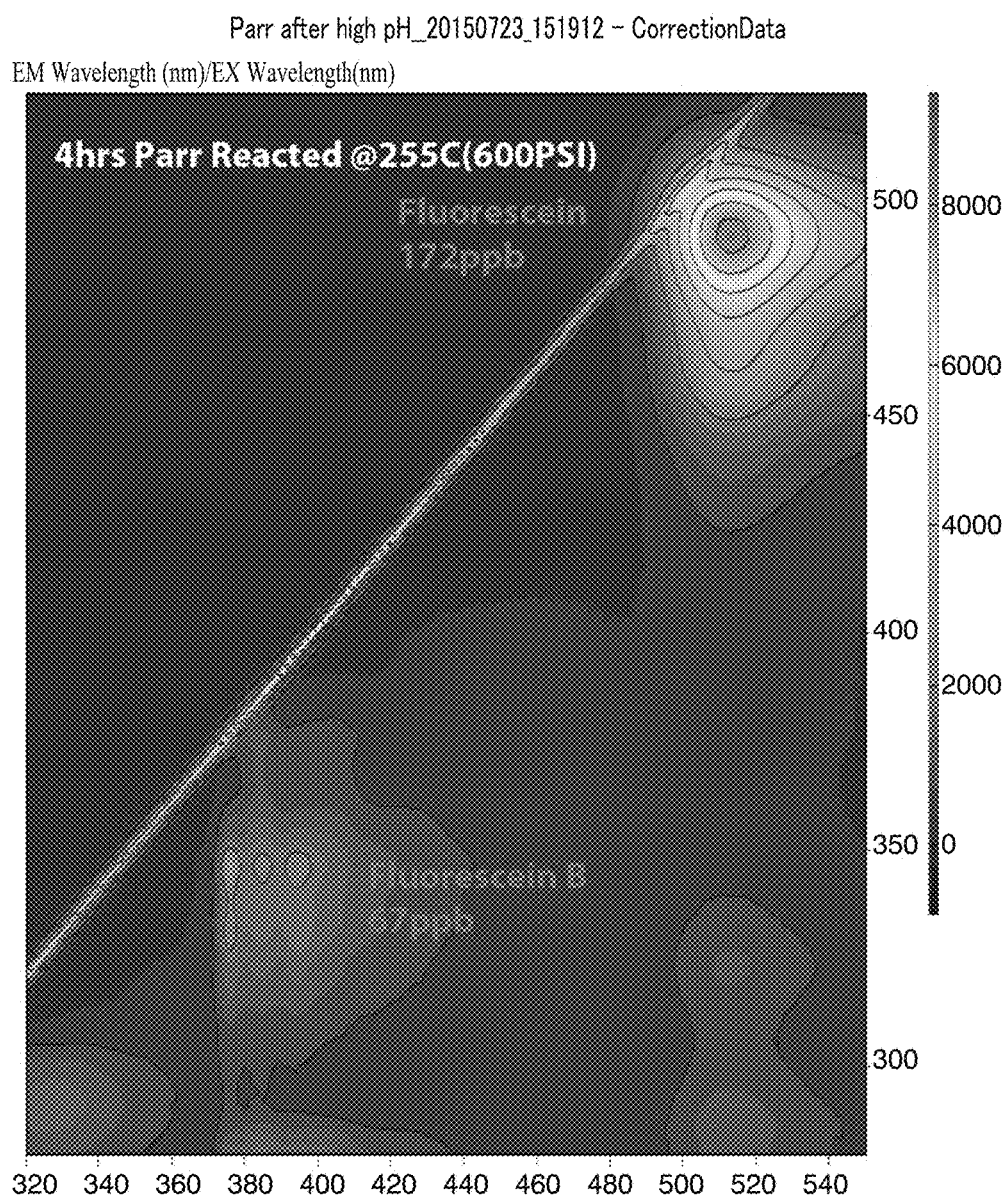
Figure 1C:
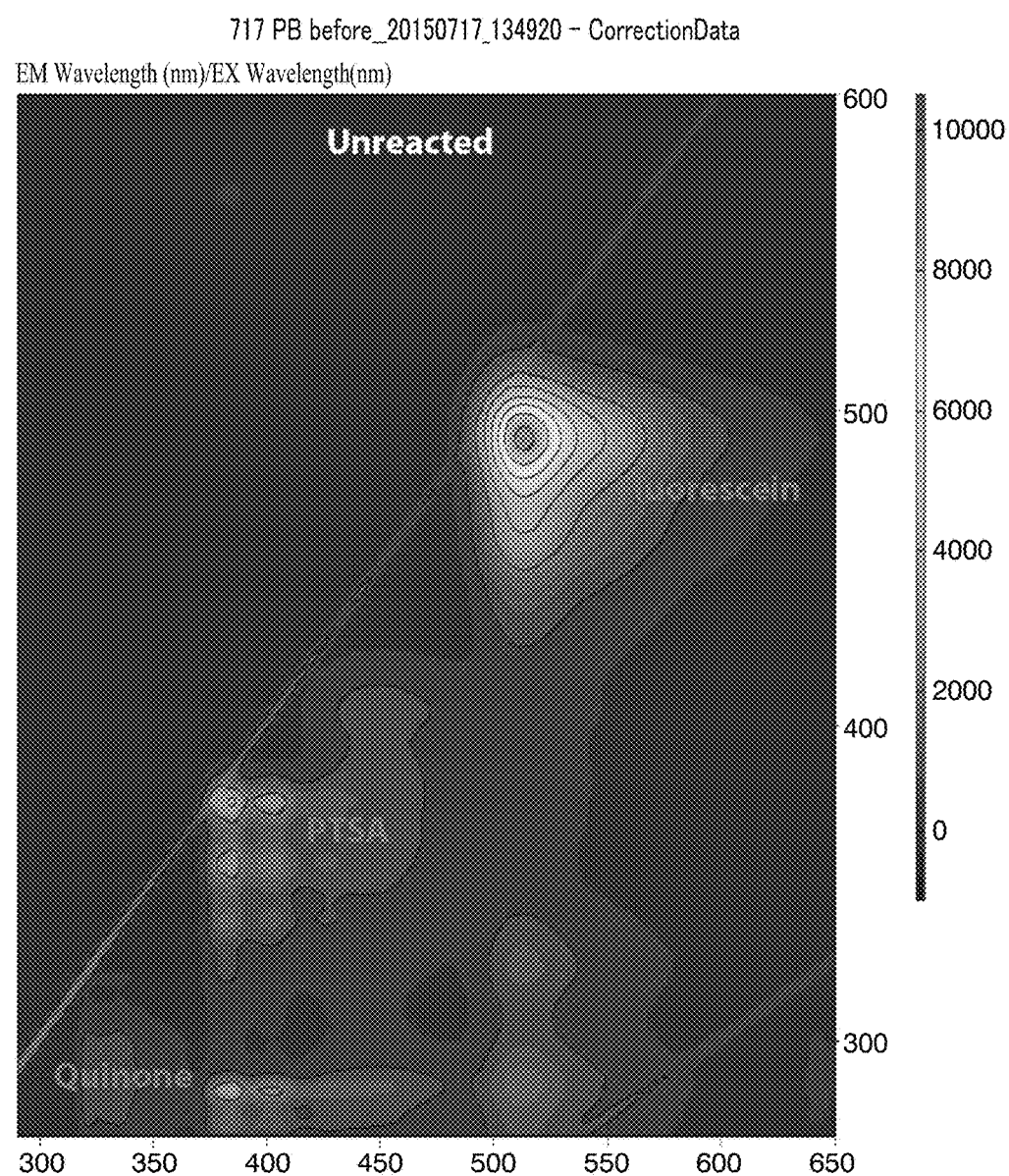
Figure 1D:
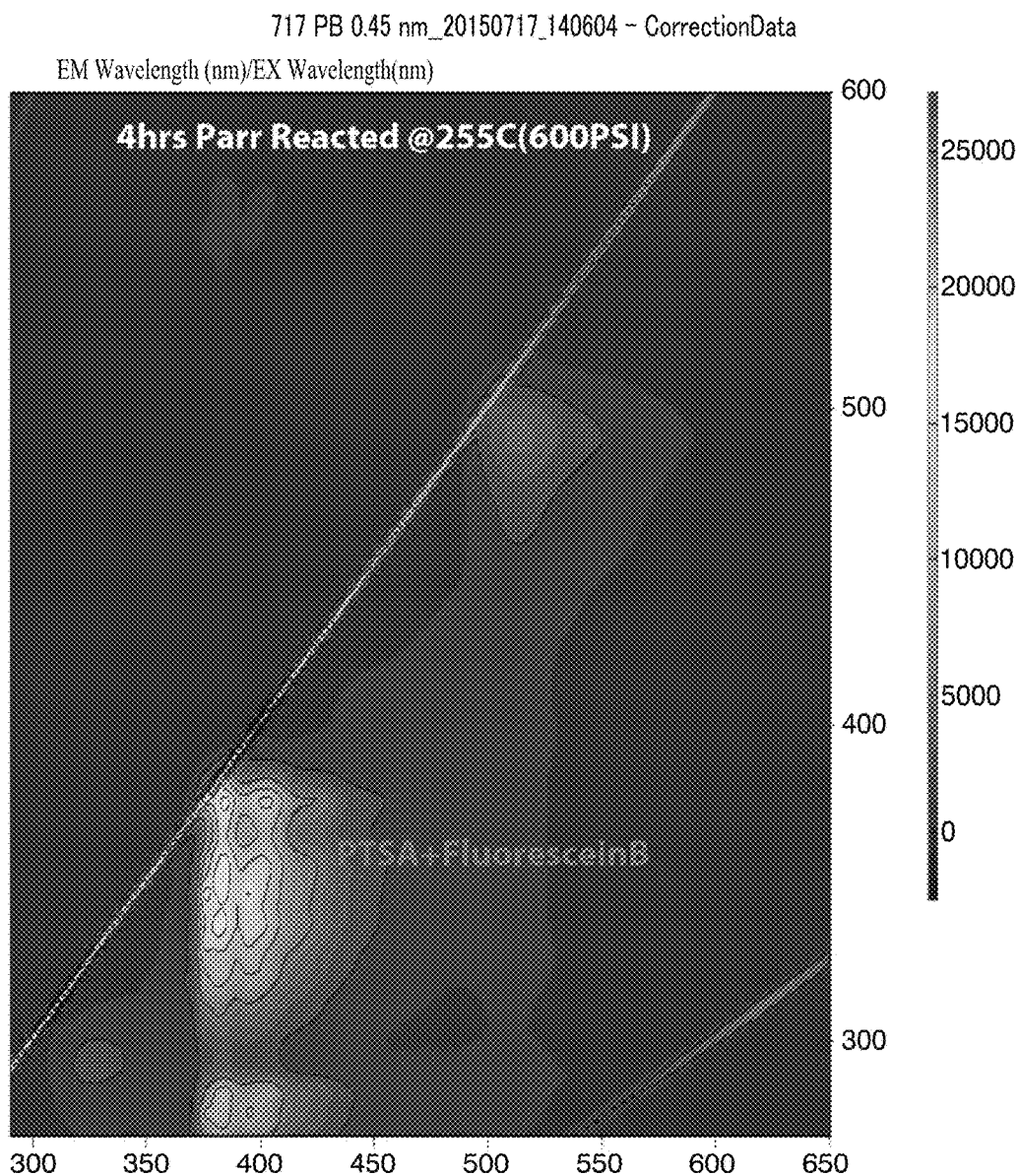
Figure 1E:
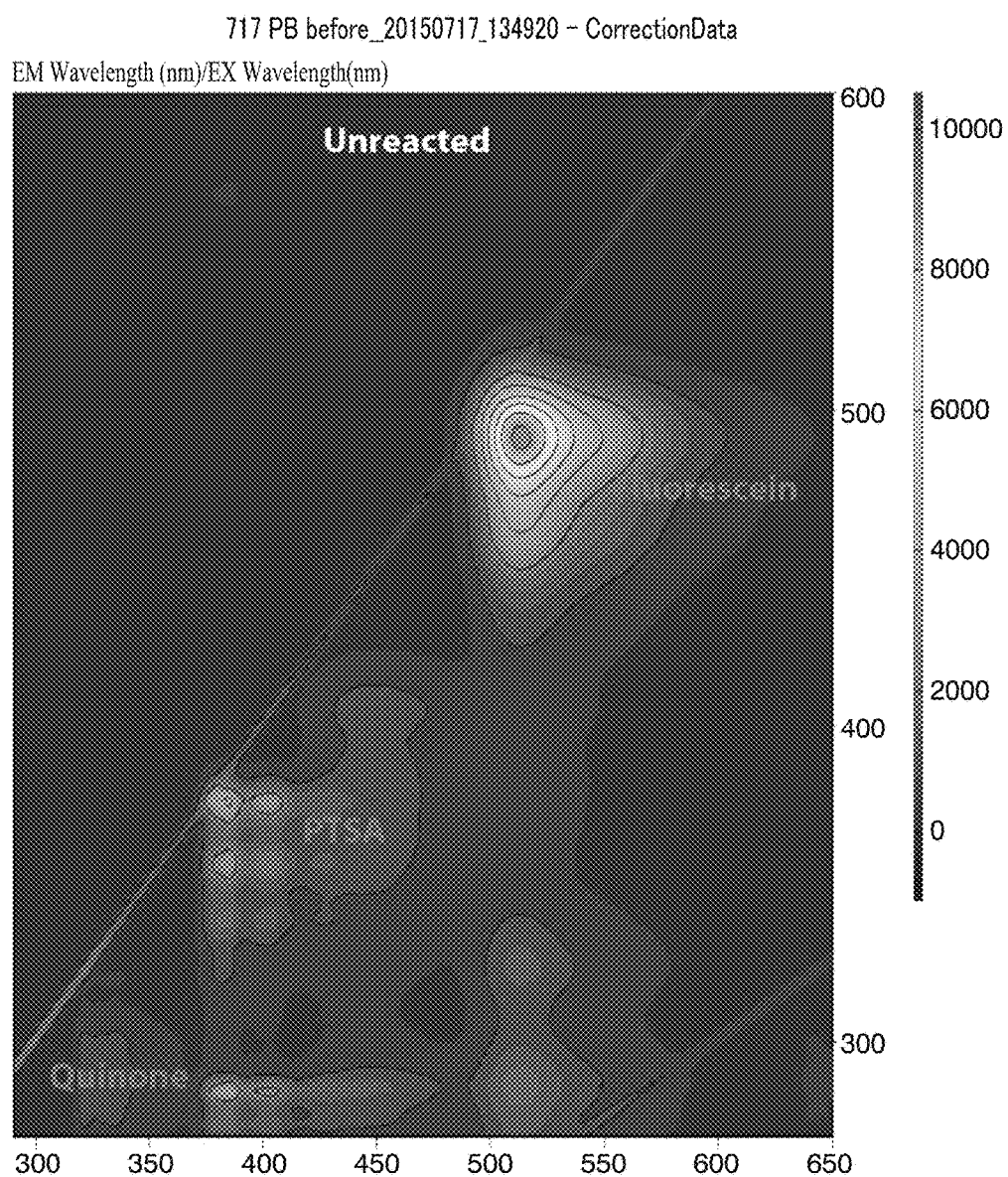
Figure 1F:
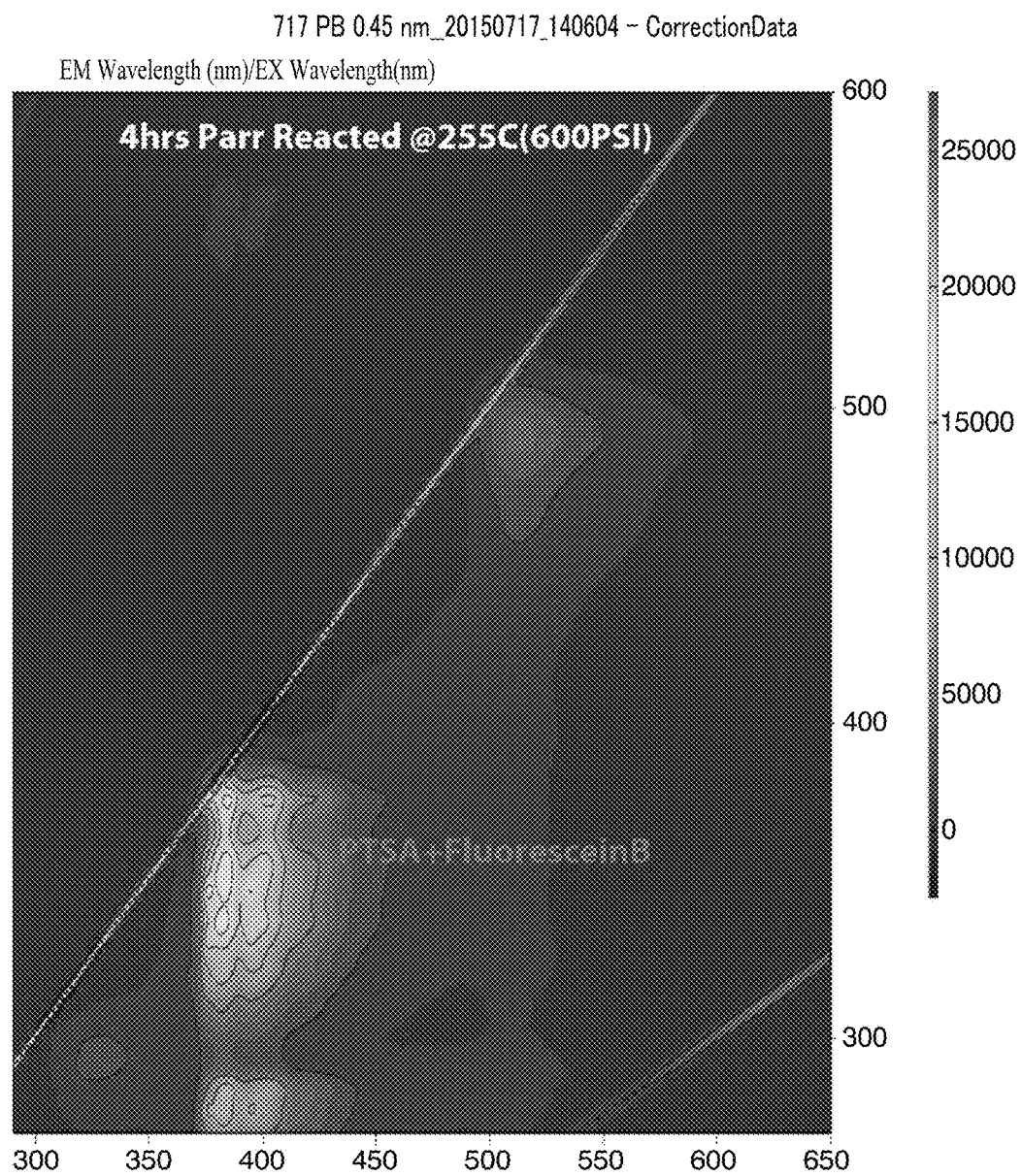

FIGS. 1A-F are representations of 3D fluorescent scans that illustrate how the thermal degradation of fluorescein can be used to detect properties of the water system that are implicated by temperature. FIG. 1A shows the measured fluorescence signal of a solution of only fluorescein at 196 ppb. FIG. 1B shows the fluorescein signal after being reacted under high heat and pressure (255° C. and 600 psi). As can be seen in FIG. 1B, some of the fluorescein broke down so that the intensity of the fluorescein signal is reduced, leaving a remaining equivalent of 172 ppb fluorescein (i.e., a 24 ppb reduction in fluorescein signal intensity). FIG. 1B shows a new fluorescent peak where PTSA should be, even though the solution contained no PTSA. Although the compound is not PTSA, quantifying it as though it was PTSA can be reported as 67 ppb PTSA (i.e., corresponding to a 67 ppb increase in intensity when quantified as PTSA). The signal of actual PTSA is shown in FIGS. 1C and 1D. FIG. 1C shows a scan of a solution of PTSA and fluorescein before being exposed to high heat and pressure and FIG. 1D shows a scan of the solution after being exposed to high heat and pressure (255° C. and 600 psi). FIG. 1D shows that the fluorescein peak degrades (into a break down product labeled as Fluorescein B), while the PTSA peak seems to have increased. As can be seen, when reacted at a high temperature, fluorescein breaks down to give a material with a fluorescent profile similar to that of PTSA. FIGS. 1E and 1F are a repeat of the experiment in FIGS. 1C and 1D.

Figure 2:
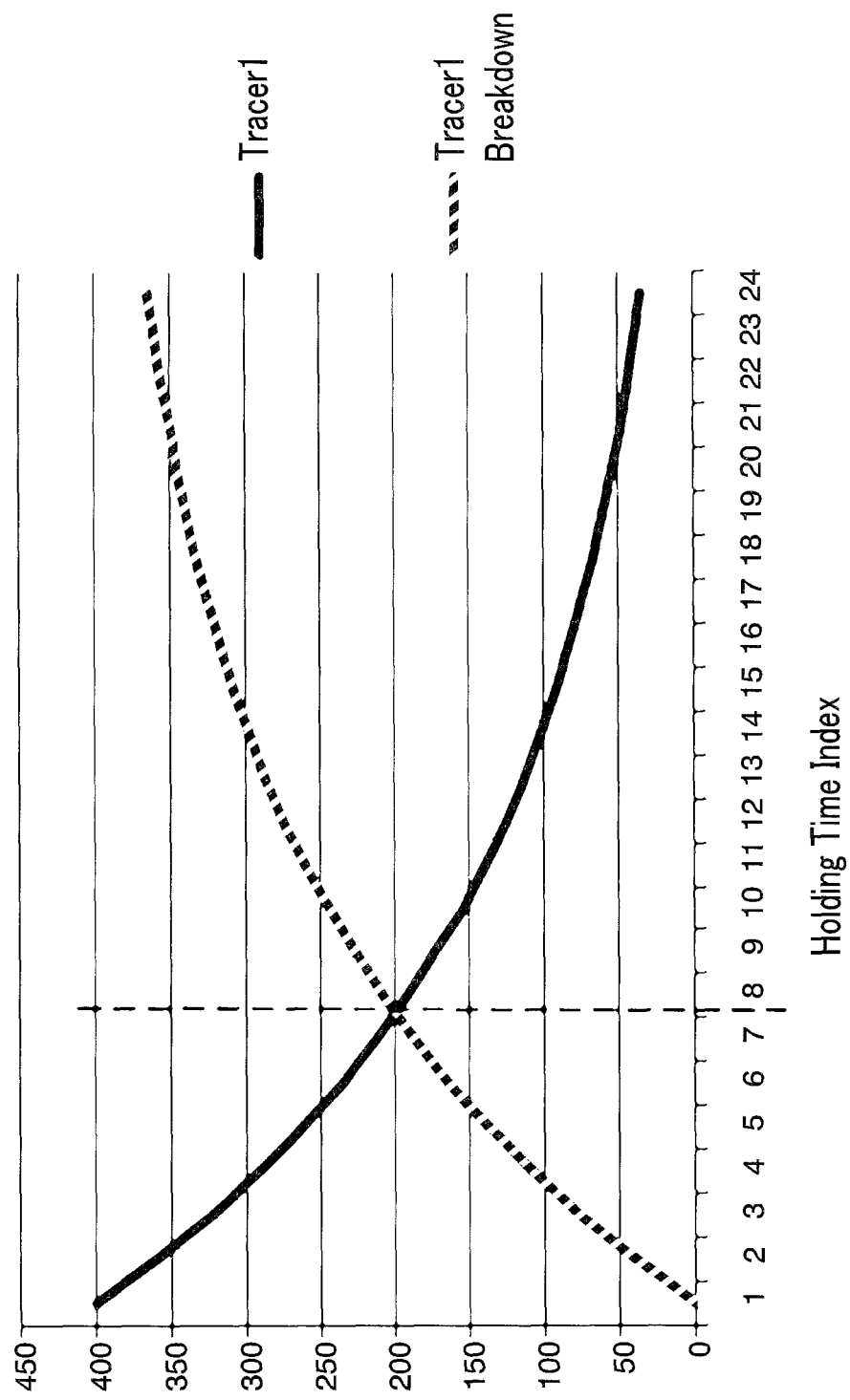
FIG. 2 is a graph showing the fluorescent signal of uranine dye and its break down product.

FIG. 2 illustrates a typical response of a single fluorescent dye that breaks down to give a second fluorescent response in a water system. For example, uranine is a fluorescent dye that breaks down to give a second fluorescent response. As can be seen in FIG. 2, the fluorescent response of the initial dye decreases with the holding time index of the water system while the fluorescent response of the break down product increases. As with fluorescein, the precursor product and the break down product can be used as the multiple tracers in aspects of this disclosure, and thus the ratio or difference between the signals of the precursor and break down product can be used to determine system parameters or events, e.g., the holding time index or changes in the holding time index.

These experiments show that fluorescein is a reactive chemical tracer that provides a measurable fluorescence signal that changes under heat and pressure conditions. The fluorescein breaks down into another product, so-called fluorescein B, which appears to be less reactive under those conditions and likewise provides a measurable signal.

To evaluate a fluid system parameter according to aspects of the invention, multiple chemical tracers are provided to the fluid system, including at least one reactive chemical tracer, and the signal of each chemical tracer is measured, e.g., at a point where the fluid passes through an area of interest in the system. Each of the multiple chemical tracers can be provided in the fluid system at a known ratio to each other, e.g., a pair of chemical tracers can be added at a constant, known ratio.

To measure the tracers, the fluid can be sampled at the area of interest or the fluid stream can be directly monitored. The area of interest should preferably be downstream of the area where the chemical tracers are introduced so that the reactive chemical tracer(s) have time to react in the fluid system. The reactive chemical tracer can breakdown or degrade a rate that is different from the other chemical tracer, whether the other chemical tracer is inert and thus provides a constant measurable signal, or whether the other chemical tracer is a reactive chemical tracer with a different signal and different breakdown rate. For example, in the case of fluorescein, as discussed above, in some water system environments, the fluorescein could be considered a reactive chemical tracer and the fluorescein B break down product could be considered as an inert chemical tracer.

The signal of the reactive chemical tracer and the other chemical tracer can be measured, and the signal of the reactive chemical tracer can be compared with the signal of the other chemical tracer. As one example of such a comparison, a ratio between the signals can be determined.

In one aspect, using multiple chemical tracers, including at least one reactive chemical tracer, can allow parameters of the fluid system to be accurately evaluated regardless of variations in flow in the system. For example, a signal ratio between a pair of chemical tracers will typically not change based on natural variations in the flow as the tracers are diluted because the tracer pair are added at a rate that is constant relative to each other, e.g., the tracers can be added together in a pre-mixed solution. Also, using two or more reactive chemical tracers, as provided in some embodiments of the invention, can provide a more sensitive method for evaluating fluid system conditions as compared with techniques that employ one or more inert tracers.

Also, systems that rely on the signal of only one chemical tracer to evaluate a parameter are typically associated with a higher frequency of false alarms. For example, to detect a leak in a boiler with a single chemical tracer, an observer will look for a depression in the concentration of the tracer. However, there are many reasons why the effective tracer concentration would dip in a boiler system, including feedwater flow rate changes, fluctuations in the rate of dye addition, untreated feedwater that enters the boiler, or an unexpected reaction of the tracer compound. Evaluating a parameter of a boiler system based on the signal of two tracers can eliminate many or all of these potential false alarms. Similarly, by using a ratio of the signal of two tracers, the evaluation system can be designed so that the ratio exhibits a positive response (i.e., the ratio increases) when the system deviates from the expected response. This further decreases the occurrence of false alarms because there are many system events that could cause responses to decrease, such as measurement equipment failure, but there are only a few system events that could cause a response to increase.

In an operating condition of the fluid system, the signals of the chemical tracers are measured and the measured signals between two or more the chemical tracers can be used to calculate a ratio that is an indicator of the operating system response. When this ratio deviates by a threshold amount from an expected value, such as a ratio established by the normal steady state of the system, it can be used as an indication that an event or abnormality has occurred in the system, which event disturbs the expected system response. The threshold of deviation from the expected value can be selected based on the particular system depending on how constant the expected value is, as well as the desired sensitivity and tolerance for false alarms. For example, an event or abnormality in the system can be presumed to have occurred when the operating ratio of the chemical tracers deviates from the expected value by greater than 40%, by greater than 25%, by greater than 15%, by greater than 10% or by greater than 5%.

The expected response of the fluid system can be empirically determined on the system. The expected response can be determined by measuring the system response of the tracers when the system is at steady state. If the system does not reach a steady state, the expected response can be determined by measuring the rate of change of the system response of the tracers in the system at normal conditions, for example.

In one aspect, the expected response of the fluid system can be established by providing multiple chemical tracers (e.g., two discrete tracers) to the system at a constant rate and allowing the system to reach a steady state, preferably under normal system conditions, where the measurable signal of each tracer is constant over time at the system location where the measurement is taken. Depending on the type and size of the fluid system, steady state conditions may be reached as quickly as 5 minutes, for example, or as long as 5 days, and typical systems will reach steady state in the range of 6 hours to 48 hours, or from 10 hours to 30 hours. Steady state conditions can be detected by calculating the ratio of the signals of a pair of tracers over time and observing when the ratio is substantially constant (e.g., varying by no more than 10% or 5%) over time. The appropriate amount of time over which the ratio must remain substantially constant to achieve steady state will depend on the system, but may be in the range of 30 minutes to 48 hours, or from 2 hours to 24 hours, or from 4 hours to 12 hours. When steady state of the fluid system is achieved, the signals of chemical tracers are monitored and recorded, and a ratio between the signals can be calculated and recorded as an indicator of the expected system response. The steady state ratio can also be considered as a mean or average of several ratios calculated from steady state signals.

The expected response of the tracers at steady state can also be determined by using a mathematical model of the system that is based on, for example, a first-order decomposition equation of each reactive tracer as well as the system parameters (e.g., temperature, volume, feed rate, and blowdown rate).

Detecting an operating system response that deviates from the expected response can be used to detect events that disturb the system steady state. As with the expected response, the system response can be monitored during steady state conditions or at non-steady state conditions. Also, as with the expected system response, mathematical modeling can be used to provide an indicator of the operating system response at steady state conditions. In many fluid systems, the chemical tracer concentration may vary during operation due to changes in, e.g., feed flow, steam rate, and measured blowdown. If the measured chemical concentrations are changing, a mathematical model can be applied to calculate the steady state signals/concentrations and steady state ratio without actually needing to achieve a steady state. In this regard, a rate of change of the tracer signals can be evaluated to determine if there is a steady state condition or not. It the tracer signals do not change over time, the system is in steady state. If the tracer signals are changing over time, the rate of change of the signals can be used with mathematical models (e.g., algorithms based on first-order decomposition equations of each tracer as well as the system parameters) to calculate the stead state signal response, which then can be compared to the expected steady state response to determine whether a system event has occurred.

The mathematical modeling of the system response can be based on measured concentrations of the system where the chemical tracers are fed to the fluid system at a constant rate, or where the chemical tracers are fed in pulse doses, or where the amount of each tracer fed to the system is ramped up over time. In some cases, it may be desirable to deliberately pulse or fluctuate the amount of chemical tracers added to the fluid system so that the steady state response can be modeled quickly, without needing to wait for steady state conditions, and used to evaluate whether a system event has occurred by comparing the response calculated by the modeling to the expected response.

Multiple chemical tracers can thus be used to establish an indicator of the expected system response, and the measured signals during operation can be used not only to evaluate system operating properties, such as temperature, fluid volume, and pH, but deviations from the expected response can be evaluated to detect system events, such as a leaking condition, excessive equipment fouling due to scaling or corrosion or microbiological growth, etc.

The chemical tracers can be added to the fluid system in any suitable amounts. The amounts might depend, for example, on the type of tracer that is used, the overall fluid volume in the system, the desired sensitivity, and the type of system parameter that is being evaluated. The chemical tracers can be added continuously, periodically, or intermittently as needed, but are preferably added so that a substantially constant, known ratio of the tracers is added to the fluid system. In this regard, the multiple tracers can be prepared as a single pre-mixed composition that is metered into the fluid system.

Exemplary concentrations of each tracer in the fluid system at steady state are in the range of 1 ppb to 100,000 ppm, 0.1 ppm to 10,000 ppm, 0.5 ppm to 1,000 ppm, 1 ppm to 500 ppm, 10 ppm to 200 ppm, and 1 ppb to 50 ppb.

The chemical tracers or their precursors can be automatically added into a fluid stream of the fluid system by a device that meters the introduction of the tracers or their precursors into the stream in a controlled way. The signals of the chemical tracers can be regularly and/or automatically monitored with sensors and equipment, including liquid chromatography (e.g., HPLC), infrared absorption, spectrophotometers, wavelength specific fluorometer probes, multichannel fluorometers, etc. Computer hardware (e.g., processor, memory, display) and software can be used to automatically record the measured signals, to compare the measured signals to each other to determine the system response, and to compare the system response to an expected system response. The data can also be logged into a database, plotted, and evaluated by the operator.

The monitoring system can include a feedback control connected to the feed pump that introduces the tracers/tracer precursors into the fluid system. The feedback control can be sensitive to the most reactive tracer so that the feed pump is controlled until the most reactive tracer can be detected at the point of measurement, i.e., so that the tracer is not completely reacted. The feedback control can assist in tuning the monitoring system so that sufficient tracer is added to the fluid system to enable detection at the point in the system where the signals are monitored.

When the system response deviates from the expected response by a threshold amount, a visual indication on a display or an audio indication can be triggered that identifies to the system operator that the fluid system has deviated from a normal condition.

It is also contemplated that aspects of the fluid system could be shut down when the system response deviates from the expected or standard response by the threshold amount, that an alarm or warning signal is triggered, safety measures are instituted, or that process control action is taken. In one example, corrective process control action can be taken that includes adding treatment components to the fluid system or changing the amount of treatment components that are being added.

These methods for detecting system events or abnormalities can be combined with other, established methods for detecting system events or abnormalities. The techniques can be compared using statistical analytics such as chemometrics or principle component analysis to determine correlations between events detected by the chemical tracers and events detected by established methods. For example, in detecting leaks of a fluid system, the use of one or more reactive tracers could be combined with established methods such as mass balance, acoustics, or visual observations to provide a very sensitive leak detection system.

These principles are illustrated in connection with the following exemplary applications.

Boiler Leak Detection

Figure 3:
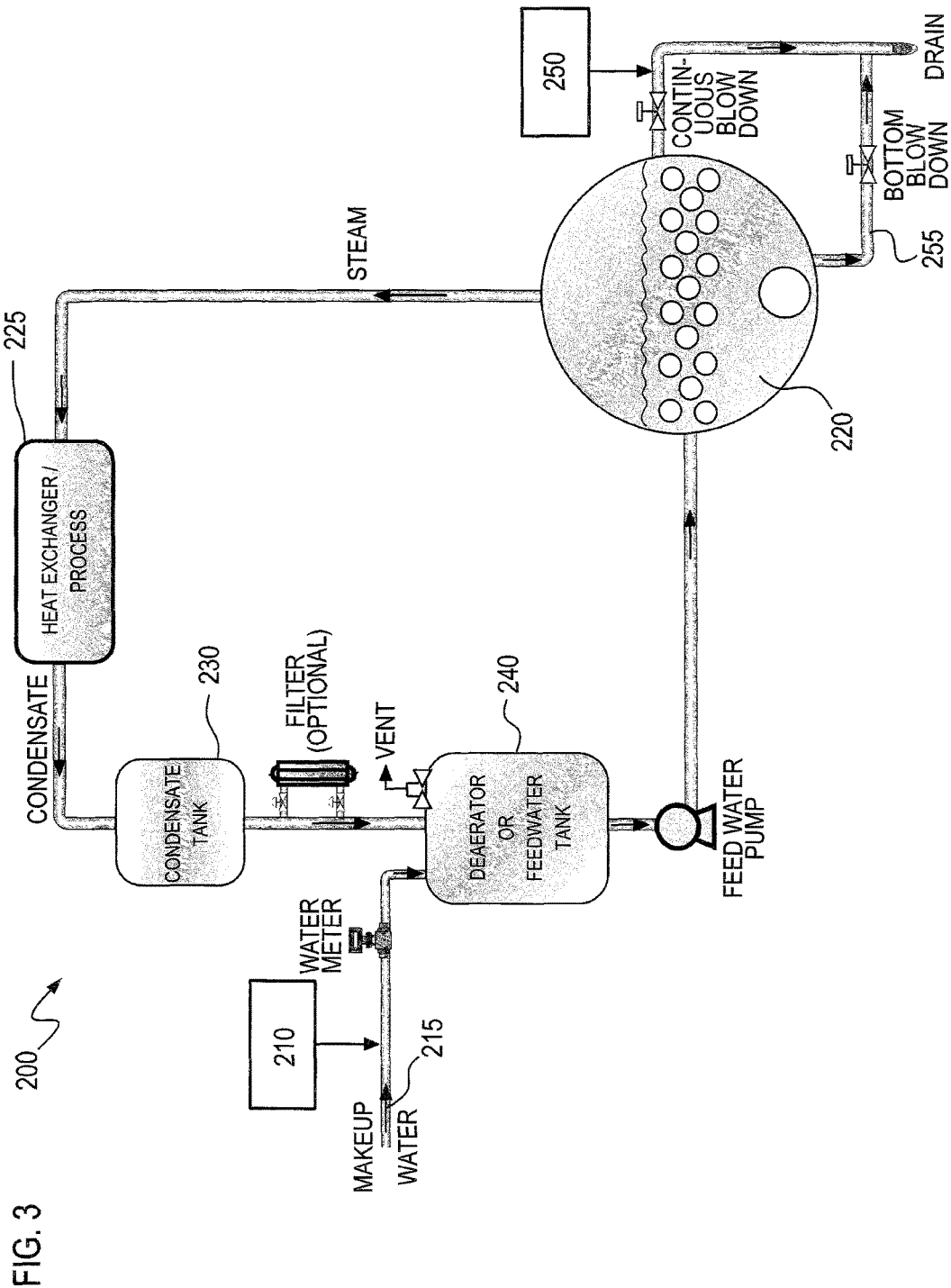
FIG. 3 is a schematic diagram illustrating a boiler system.

In boiler leak detection, a pair of reactive chemical tracers can be selected and fed at a constant, specific, known ratio (feed ratio) into a boiler system. FIG. 3 illustrates a typical boiler system 200, where the boiler 200 provides steam for a heat exchanger 225. Condensate from the heat exchanger is collected in a condensate tank 230 that is fed to a deaerator or feedwater tank 240 before being directed back to the boiler 220. Makeup water stream 215 is directed to tank 240 as needed to ensure that the amount of water in the system remains constant. The make water stream can be metered into tank 240 with a water meter that can be controlled based on, e.g., a water level sensor in the boiler. The boiler also has a continuous and bottom blow down to remove water from the boiler. The pair of reactive chemical tracers can be introduced at port 210 into the makeup water stream 215. The signals of the reactive chemical tracers can be sampled and measured at monitoring station 250 from the blowdown stream of the boiler 220.

A boiler with no leak will achieve a steady state inside the boiler with blow down leaving the boiler and makeup water entering at equal rates. When steady state is achieved, the signals of the tracer pair can be monitored for the ratio (boiler ratio) between the tracers to eliminate any noise in concentration values. The boiler ratio can be measured from a blowdown stream at monitoring station 250, for example. The degradation of tracers will cause the boiler ratio to differ significantly from a ratio measured at the feed of the tracers 210. If a leak occurs in the boiler, additional feedwater containing the tracer pair at feed ratio values will be added to compensate for the water loss, diluting the boiler water and shifting the boiler ratio value away from steady state value.

Figure 4:
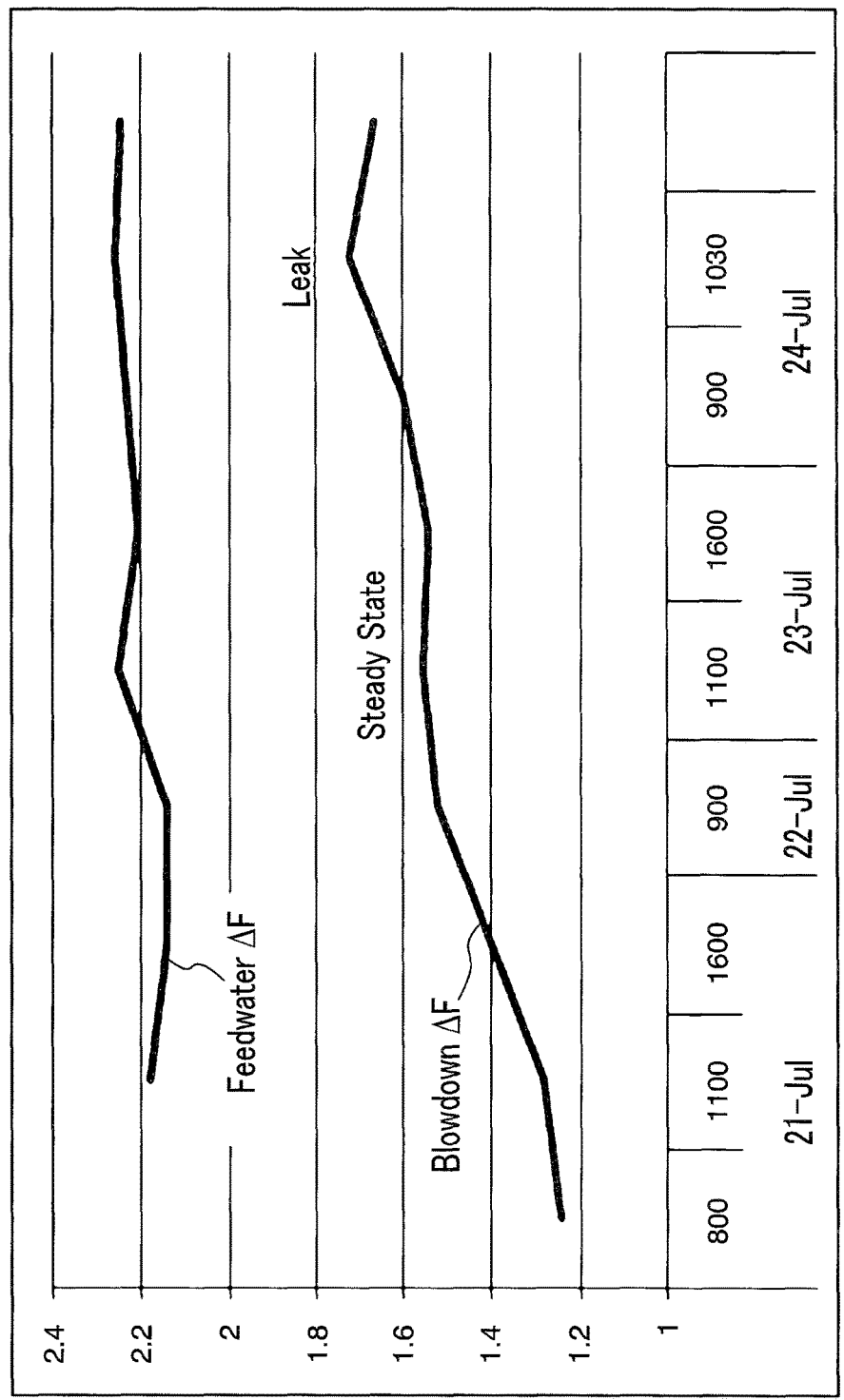
FIG. 4 is a graph illustrating a detectable leak condition in a boiler system.

FIG. 4 shows experimental data on a boiler system using a pair of reactive chemical tracers (Fluorescein and PTSA) that were introduced into the system. The x-axis of FIG. 4 is the day and time of the boiler operation, and the y-axis is ΔF, which corresponds to a ratio of the signals of the Fluorescein and PTSA. As can be seen in FIG. 4, a steady state of the boiler water system is achieved after about 24 hours when ΔF reaches a substantially constant value, i.e., it deviates less than about 10% over a period of several hours. By periodically monitoring the signals of the reactive tracer chemicals, calculating ΔF and comparing to the steady state value, a leak can be detected when the ratio increases beyond a threshold amount. Because a leak in the system causes an influx of fresh water and unreacted dye to be added to the system, the dye has less time to degrade in the system and the ratio increases closer to the ratio of the makeup or feedwater stream.

The boiler can have a volume of 10,000 to 50,000 gal, more typically from 20,000 to 40,000 gal, and can be operated at a blowdown rate of 5 to 100 gal per minute or from 10 to 40 gal per minute. For a 30,000 gal volume boiler with a blowdown rate of 30 gal per minute, the boiler system has a blowdown index of 17 hours (ln 2*30,000 gal/20 gal/min), which represents the holding time in the boiler. If there is a 5 gal per minute leak in the boiler, the holding time decreases to 14 hours (ln 2*30,000 gal/25 gal/min). Thus, relatively small leaks translate to large changes in holding times that can be detected according to aspects of the invention. Preferably leaks can be detected on the order of 0.1 to 100 gal per minute, 0.5 gal to 50 gal per minute, or 1 to 10 gal per minute.

Figure 5:
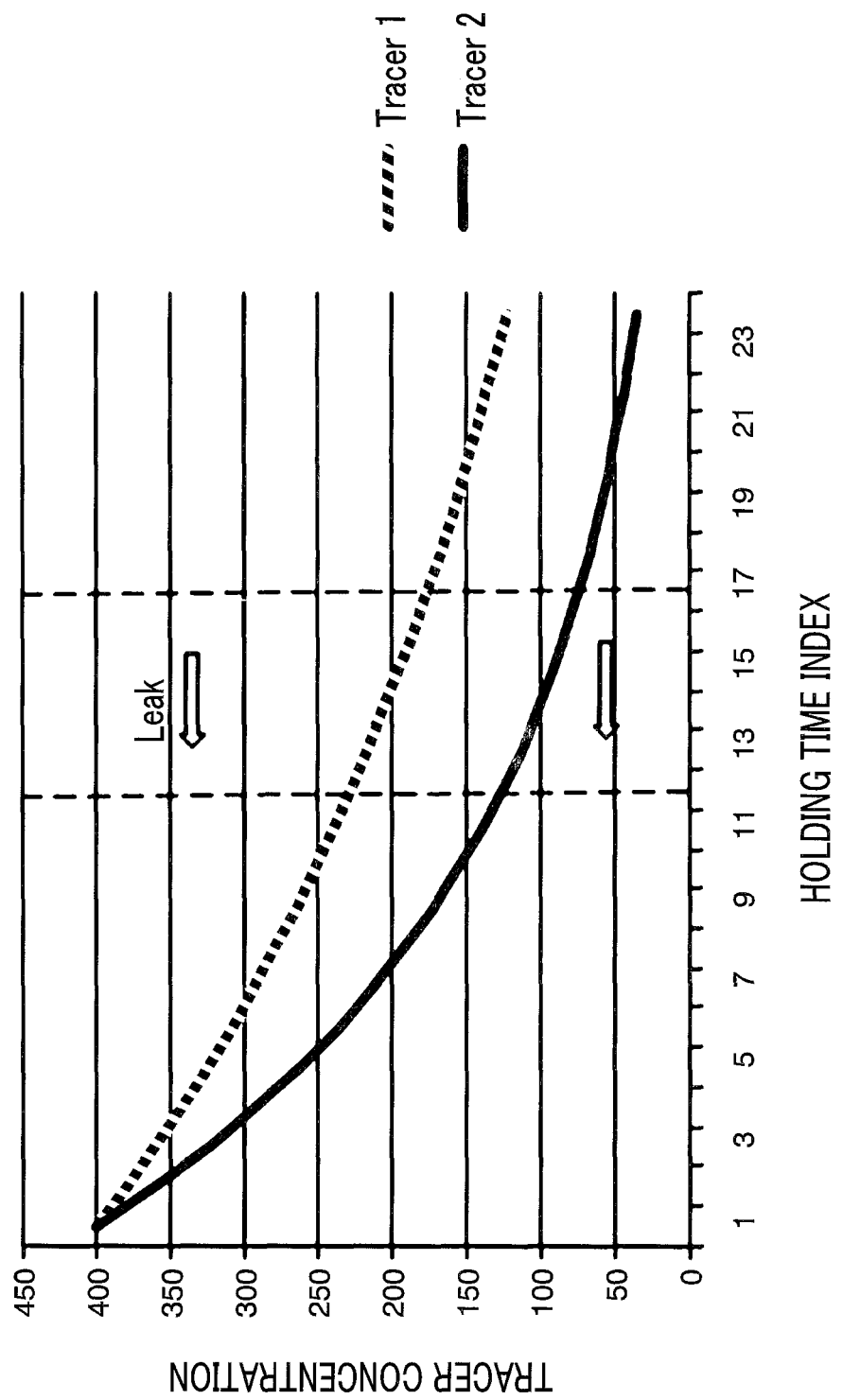
FIG. 5 is a graph illustrating the change in reactive tracer signals based on the holding time index of a boiler system.

FIG. 5 is a graph illustrating the change in tracer signal based on the holding time index of the boiler. As can be seen in FIG. 5, first and second tracers can be added to a boiler system that provide signals that change intensity at different rates in the boiler system. A ratio or difference between the two tracer signals can be used to measure the holding time index, which can be compared with an expected value to determine whether a leak condition occurs. For example, the ratio of the tracer signals is different when the holding time is at 14 hours when there is a leak, as compared to when the holding time is 17 hours and there is no leak. The leak in the boiler system can thus be readily detected based on a change in the ratio of the two signals or based on a change in the difference between the two signals.

Figure 6A:
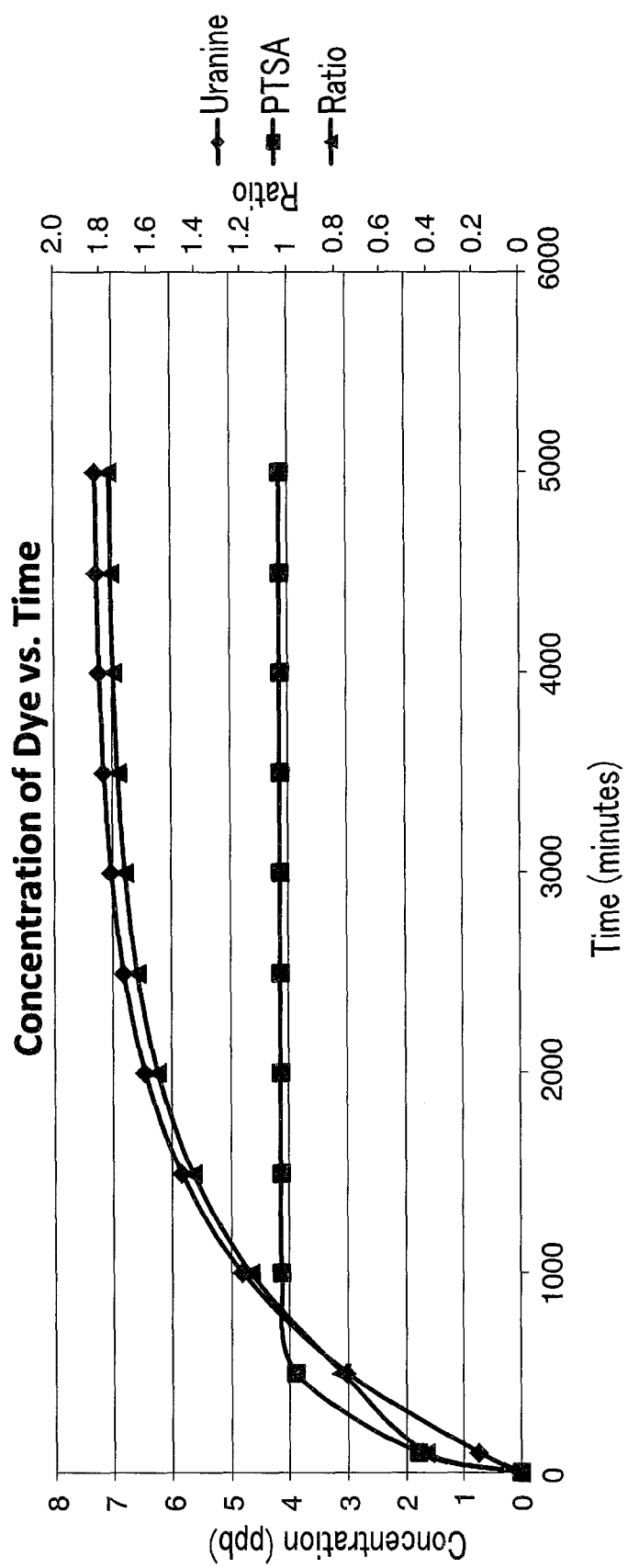
FIGS. 6A and 6B are graphs illustrating the concentration of reactive dyes in a boiler system over time.
Figure 6B:
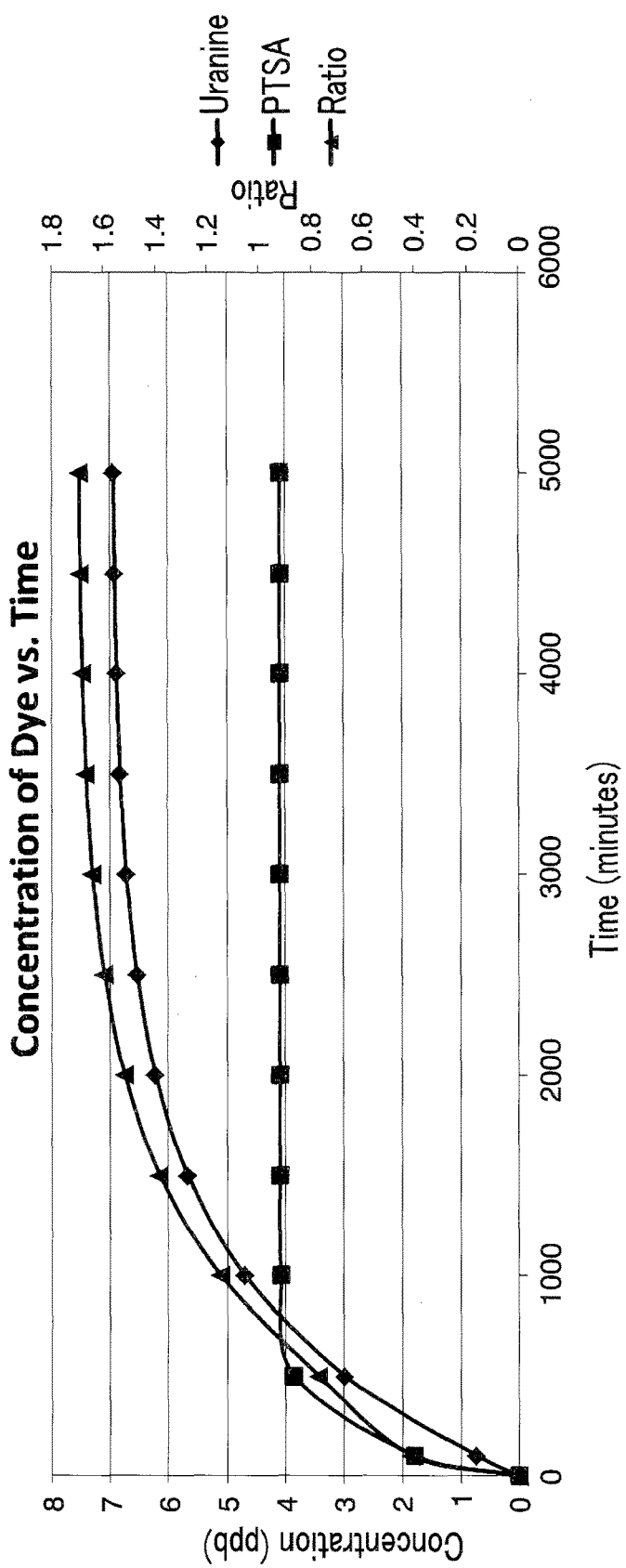

Additional experiments were conducted in a boiler system to evaluate the observed ratio of two tracer signals when a leak condition is simulated. In FIGS. 6A and 6B uranine and PTSA dyes are added to the makeup water of the boiler system. In the FIGS. 6A and 6B experiments, the boiler volume and feed rate are kept constant, but the blowdown rate is changed slightly to simulate the presence of a leak. The conditions in FIGS. 6A and 6B are as follows:

| Conditions | FIG. 6A | FIG. 6B |
|---|---|---|
| V (Volume) (Gallons) | 18000 | 18000 |
| $F_{out}$ (Blowdown) (GPM) | 12 | 13 |
| $F_{in}$ (Feed Rate In) (GPM) | 879 | 879 |

In both the FIGS. 6A and 6B experiments, the signal of the dyes was measured from the time the dye is added (i.e., corresponding to 0 minutes) until a steady state in the boiler is reached. The concentration of the dyes at each sampling time was determined, and the ratio of the dyes at each sampling time was calculated. FIGS. 6A and 6B each illustrate the concentrations of the dyes and the calculated ratio over time. The graphed data of the dye ratios is provided below:

| time (minutes) | Ratio FIG. 6A (uranine/PTSA) | Ratio FIG. 6B (uranine/PTSA) |
|---|---|---|
| 0 | 0 | 0 |
| 100 | 0.414 | 0.414 |
| 500 | 0.778 | 0.774 |
| 1000 | 1.165 | 1.150 |
| 1500 | 1.414 | 1.384 |
| 2000 | 1.561 | 1.520 |
| 2500 | 1.648 | 1.597 |
| 3000 | 1.699 | 1.641 |
| 3500 | 1.728 | 1.666 |
| 4000 | 1.746 | 1.681 |
| 4500 | 1.756 | 1.689 |
| 5000 | 1.762 | 1.693 |

As can be seen by comparing FIG. 6A to 6B, the ratio of the dyes is very sensitive to leaks in the boiler (or the blowdown rate) because the signal of each of these dyes varies with the residence time of the dye in the boiler. In the experiments described above, at steady state conditions, the ratio decreased from 1.762 to 1.693 when the blowdown was increased from 12 GPM to 13 GPM. In this case, a 7.7% increase in blowdown exhibited a 4% decrease in the dye ratio. Accordingly, such a drop in the dye ratio from a steady state condition may indicate a change in the blowdown rate or a leak.

This experiment illustrates the convenience and utility of using a plurality of chemical tracers to evaluate parameters in a water system. In this regard, the blowdown rate is itself very difficult to measure, whereas the dye ratio is a straight forward and nearly instant measurement that can provide a rapid and reliable method for determining changes in the boiler blowdown, holding time, or the presence of a leak by comparing a response of the ratio after the leak with the expected response, i.e., observing the drop in the ratio.

FIGS. 6A and 6B also indicate the power of multiple reactive dyes in predicting the steady state concentration since the steady state concentration can be modeled mathematically. In many boiler systems, the dye concentration will vary during operation due to changes in, e.g., feed water flow, steam rate, and measured blow down. In the systems described herein, the signals of the chemical tracers can be measured in the blowdown, for example, and those signals can be used to calculate the steady state concentration ratio without actually needing to achieve steady state, as described previously.

Heat Exchange System—

One or more thermally reactive tracers can be introduced into a heat exchange system. As skin temperature of the heat exchanger decreases due to fouling, the tracer ratio will change, i.e. the concentration of the more temperature sensitive tracer will increase relative to the reference tracer. The ratio can be monitored to determine whether it deviates from an expected value by a threshold amount, at which time the heat exchanger can be serviced to remove fouling.

pH Detection—

Tracers that are sensitive to variable pH can be used to indicate excursions due to microbiological fouling or corrosion because both of these situations create localized pH anomalies.

Controlling Concentration of Water Treatment Components—

Treatment components can be added to a water system to treat the system for corrosion, scale, fouling, microbiological growth, etc. It is important to feed the correct amount of the treatment component into the system to minimize cost and to ensure that the system or processes are not damaged. Multiple tracers can be used to control amounts of water treatment components in the water system. For example, the table below explains what the change in the ratios of the signals or differences between the signals can mean for the water system:

| Observation | Implication |
|---|---|
| Ratio or difference between dyes changes but absolute value of least reactive dye is constant | Holding time index is decreasing or increasing |
| Ratio does not change but absolute value of least reactive component increases | Holding time index is not changing but treatment component concentration is increasing |
| Ratio does not change but absolute value of least reactive component decreases | Holding time index is not changing but treatment component concentration is decreasing. |

Process control action can be taken based on the above observations, including adding additional treatment components to the water system or changing the amount of treatment components that are being added to the water system. In monitoring systems that use only one tracer, the treatment component concentration is only evaluated by the absolute concentration of the tracer, which can provide erroneous information. For example, the concentration can fluctuate based on both product concentration and holding time in the system. The use of a ratio or difference between multiple tracers in accordance with aspects of the disclosure can distinguish between variation in both holding time and treatment product concentration.

This disclosure has been presented for purposes of illustration and description and is not intended to be exhaustive or limiting. Modifications and variations will be apparent to those of ordinary skill in the art, while still practicing the inventions defined in the claims. The embodiments were chosen and described in order to explain principles and practical applications, and to enable others of ordinary skill in the art to understand the disclosure for various embodiments with various modifications as are suited to the particular use contemplated.

What is claimed is:

1. A method for evaluating a fluid system in which fluid flows through the system, the method comprising:
   (a) introducing a plurality of chemical tracers into the fluid, including at least one reactive tracer that is reactive in the fluid to at least one of the fluid temperature and fluid pH, each of the plurality of chemical tracers providing a measurable signal, and the measurable signal of the at least one reactive tracer changing intensity as the reactive tracer reacts in the fluid;
   (b) measuring the signals of each of the plurality of chemical tracers in the fluid system;
   (c) determining an indicator of a fluid system operating response based on a relationship between the measured signal of the reactive chemical tracer and the measured signal of another chemical tracer of the plurality of chemical tracers;
   (d) comparing the indicator of the fluid system operating response in step (c) with an indicator of an expected response of the fluid system; and
   (e) using the comparison in step (d) to (i) evaluate an operating property of the fluid system; and/or (ii) determine whether an event has occurred in the fluid system.

2. The method according to claim 1, wherein the at least one reactive chemical tracer and the another chemical tracer are introduced into the fluid system at a constant ratio.

3. The method according to claim 1, further comprising empirically determining the indicator of the expected response of the fluid system by measuring the signals of the plurality of chemical tracers in the fluid system during normal operation.

4. The method according to claim 1, wherein the indicator of the fluid system operating response corresponds to a steady state operating response that is calculated by using a mathematical model with the measured signal of the reactive chemical tracer and the measured signal of the another chemical tracer.

5. The method according to claim 1, wherein the indicator of the expected response of the fluid system is an indicator of the expected response of the fluid system at a steady state.

6. The method of claim 5, further comprising determining the indicator of the expected response of the fluid system at the steady state by:
   (f) allowing the fluid system to reach the steady state;
   (g) while the fluid system is at the steady state, measuring a steady state signal of the at least one reactive tracer and measuring a steady state signal of the another chemical tracer,
   (h) determining the indicator of the expected response of the fluid system at steady state based on a relationship between the measured steady state signal of the at least one reactive tracer and the measured steady state signal of the another chemical tracer.

7. The method according to claim 6, wherein step (h) includes determining a ratio of the measured steady state signal of the at least one reactive tracer and the measured steady state signal of the another chemical tracer.

8. The method according to claim 1, further determining that the event has occurred if the indicator of the fluid system operating response deviates by a threshold amount from the indicator of the expected response of the fluid system.

9. The method according to claim 1, wherein the indicator of the fluid system operating response is either (i) a ratio of the measured signal of the reactive chemical tracer and the measured signal of the another chemical tracer; or (ii) a difference between the measured signal of the reactive chemical tracer and the measured signal of the another chemical tracer.

10. The method according to claim 1, wherein the comparison in step (d) is used to determine a leak in the fluid system.

11. The method according to claim 1, wherein the measurable signal of the at least one reactive chemical tracer changes intensity based on the fluid temperature.

12. The method according to claim 1, wherein the at least one reactive chemical tracer is fluorescein and the another chemical tracer is a break down product of fluorescein.

13. The method according to claim 1, wherein the comparison in step (d) is used to determine the existence of fouling of equipment surfaces of equipment used in the fluid system.

14. The method according to claim 13, wherein the fouling is corrosion, scaling, or microbiological growth.

15. The method according to claim 1, wherein the another chemical tracer is a second reactive tracer that is reactive in the fluid system and that provides a measureable signal which changes intensity as it reacts in the fluid system.

16. A method of detecting leaks in a water system where heated water circulates through the system, the method comprising:
    (a) providing a plurality of chemical tracers into a stream of the water system, including at least one thermally reactive tracer, each of the plurality of chemical tracers providing a measurable signal, and the measurable signal of the at least one thermally reactive tracer changing intensity based on temperature of the heated water circulating through the system;
    (b) measuring the signals of each of the plurality of chemical tracers in the water system;
    (c) determining an indicator of a water system operating response based on a relationship between the measured signal of the thermally reactive chemical tracer and the measured signal of another chemical tracer of the plurality of chemical tracers;
    (d) comparing the indicator of the water system operating response in step (c) with an indicator of an expected response of the water system; and
    (e) determining that the water system has a leak condition if the indicator of the water system operating response deviates by a threshold amount from the expected response of the water system.

17. The method according to claim 16, wherein the water system is a boiler water system including a boiler and a heat exchanger.

18. The method according to claim 16, wherein the indicator of the water system operating response is either (i) a ratio of the measured signal of the thermally reactive chemical tracer and the measured signal of the another chemical tracer; or (ii) a difference between the measured signal of the thermally reactive chemical tracer and the measured signal of the another chemical tracer.

19. The method according to claim 16, wherein the indicator of the water system operating response relates to a holding time of the water in the water system.

20. The method according to claim 16, wherein the water in the water system is heated to a temperature in the range of from 200° C. to 300° C.

21. A method for evaluating a parameter of a water system in which water flows through the system, the method comprising:
    (a) providing to the water of the water system at least a first reactive chemical tracer and a second reactive chemical tracer in a known ratio, the first reactive chemical tracer being reactive to a property of the water in the water system such that it provides a measurable signal that changes intensity as it reacts in the water, and the second reactive chemical tracer also being reactive to the property of the water in the water system such that it also provides a provides a measurable signal that changes intensity as it reacts in the water,
    (b) then measuring the signals of the first and second reactive chemical tracers;
    (c) then comparing the measured signal of the first reactive chemical tracer with the measured signal of the second reactive chemical tracer; and
    (d) then evaluating the parameter of the water system based on the comparison in step (c).

22. The method according to claim 21, wherein the comparison in step (c) includes (i) determining a ratio of the measured signals of the first and second reactive chemical tracers, or (ii) determining a difference between the measured signals of the first and second reactive chemical tracers.

23. The method according to claim 21, wherein the measureable signal of the first reactive tracer changes intensity in the water at a different rate than the measureable signal of the second reactive tracer.

24. The method according to claim 21, wherein the measured signals of the first reactive chemical tracer and the second reactive chemical tracer change intensities depending on the temperature of the water that flows through the water system.

* * * * *